US009531277B2

(12) United States Patent
Kikuchi (10) Patent No.: US 9,531,277 B2
(45) Date of Patent: Dec. 27, 2016

(54) SWITCHING CONVERTER, CONTROL CIRCUIT THEREOF, AC/DC CONVERTER, POWER ADAPTER AND ELECTRONIC DEVICE

(71) Applicant: ROHM CO., LTD., Ukyo-ku, Kyoto (JP)

(72) Inventor: Hiroki Kikuchi, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 78 days.

(21) Appl. No.: 14/553,178

(22) Filed: Nov. 25, 2014

(65) Prior Publication Data

US 2015/0155704 A1    Jun. 4, 2015

(30) Foreign Application Priority Data

Dec. 2, 2013  (JP) ................... 2013-249404

(51) Int. Cl.

| *H02M 3/335* | (2006.01) |
| *H02M 1/32* | (2007.01) |
| *H02H 3/087* | (2006.01) |
| *H02H 7/12* | (2006.01) |
| *H02M 1/00* | (2006.01) |

(52) U.S. Cl.
CPC ........ *H02M 3/33507* (2013.01); *H02H 3/087* (2013.01); *H02H 7/1213* (2013.01); *H02M 1/32* (2013.01); *H02M 2001/0009* (2013.01)

(58) Field of Classification Search
CPC ... H02M 3/335; H02M 3/33507; H02M 3/087
USPC ............ 363/21.13–21.18; 323/282–285, 351
See application file for complete search history.

(56) References Cited

U.S. PATENT DOCUMENTS

| RE42,532 E   * | 7/2011  | Isham ................... 323/224 |
| 8,564,257 B2 * | 10/2013 | Park .................. H02M 1/4225 |
|                |         |                          323/207 |
| 2009/0267583 A1* | 10/2009 | Hsu ................. H02M 3/33507 |
|                  |         |                        323/284 |

FOREIGN PATENT DOCUMENTS

| JP | H08280174 A | 10/1996 |
| JP | 2012019632 A | 1/2012 |

* cited by examiner

*Primary Examiner* — Adolf Berhane
*Assistant Examiner* — Nusrat Quddus
(74) *Attorney, Agent, or Firm* — Cantor Colburn LLP (57) ABSTRACT

A control circuit used in a switching converter having a coil, a switching transistor, and a detection resistor, includes: a current detection terminal configured to receive a detection voltage obtained by superimposing a voltage detection signal on a current detection signal; a sample hold circuit configured to sample-hold the detection voltage in an OFF period of the switching transistor to generate a sample hold voltage; a variable amplifier configured to amplify a difference between the sample hold voltage and the detection voltage; a duty controller configured to generate a pulse modulation signal; a driver configured to control the switching transistor based on the pulse modulation signal; and an overcurrent protection circuit configured to compare the detection voltage with a predetermined threshold voltage and change the pulse modulation signal to an OFF level of a switching transistor when the detection voltage is identical to the predetermined threshold voltage.

18 Claims, 11 Drawing Sheets

SWITCHING CONVERTER, CONTROL CIRCUIT THEREOF, AC/DC CONVERTER, POWER ADAPTER AND ELECTRONIC DEVICE

CROSS-REFERENCE TO RELATED APPLICATIONS

This application is based upon and claims the benefit of priority from Japan Patent Applications No. 2013-249404, filed on Dec. 2, 2013, the entire contents of which are incorporated herein by reference.

TECHNICAL FIELD

The present disclosure relates to a switching converter.

BACKGROUND

A variety of home appliances including TVs or refrigerators are operated by receiving commercial alternating current (AC) power from an external source. Electronic devices such as laptop computers, portable telephone terminals, or tablet PCs may also be operated by commercial AC power, or batteries equipped in the electronic devices may be charged by commercial AC power. Such home appliances or electronic devices (hereinafter, collectively referred to as "electronic devices") include a power device (inverter) that AC/DC converts a commercial AC voltage, or an inverter is equipped in an external power adapter (AC adapter) of an electronic device.

Figure 1:
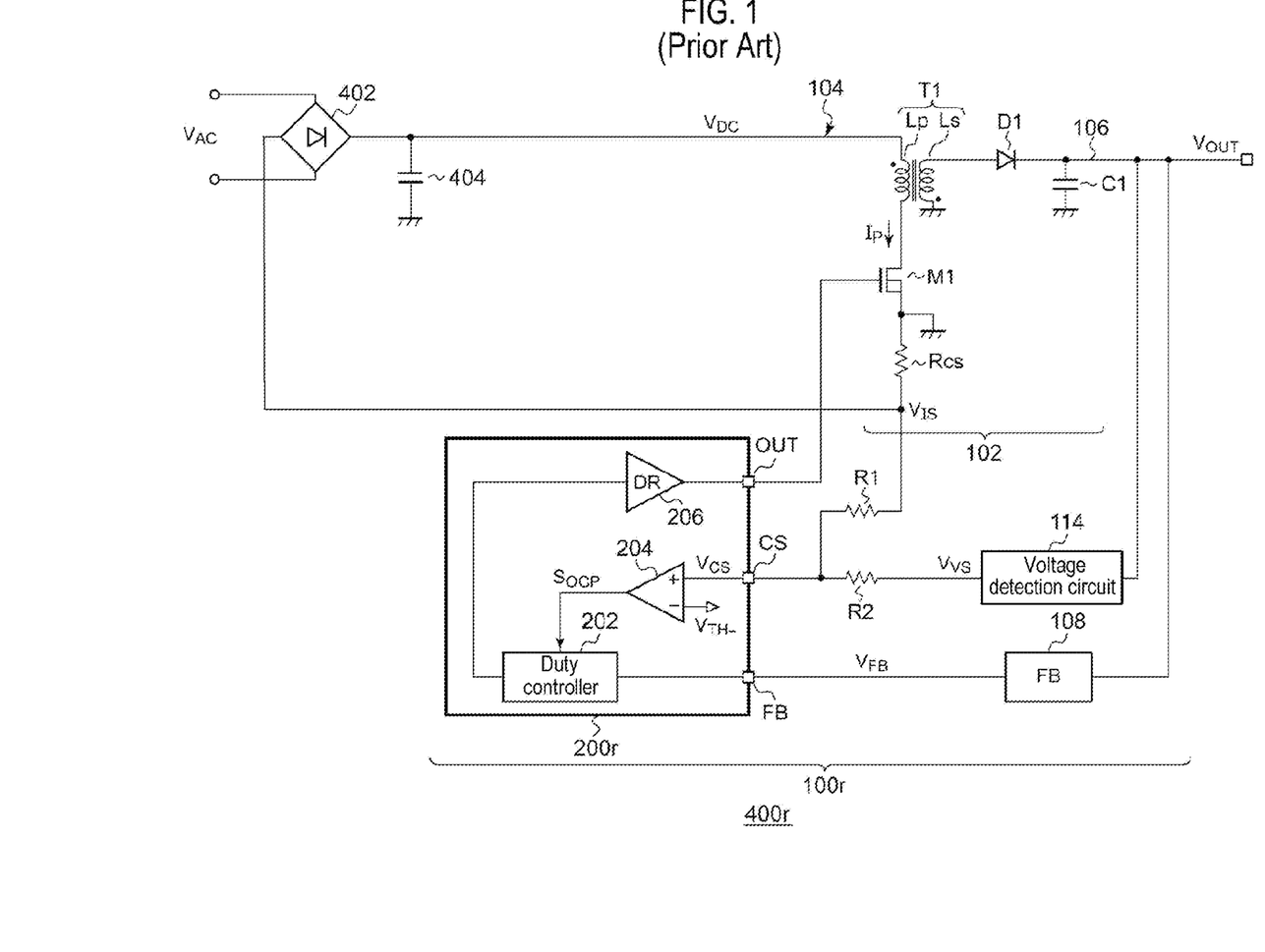
FIG. 1 is a block diagram of an AC/DC converter reviewed by the present inventor.

FIG. 1 is a block diagram of an AC/DC converter 400r reviewed by the present inventor. The AC/DC converter 400r mainly includes a rectifying circuit 402, a smoothing capacitor 404, and a DC/DC converter (switching converter) 100r.

The rectifying circuit 402 is a diode bridge circuit that full-wave rectifies a commercial AC voltage $V_{AC}$. An output voltage from the rectifying circuit 402 is smoothed by the smoothing capacitor 404 and converted into a DC voltage $V_{DC}$.

The DC voltage $V_{DC}$ is supplied to an input line 104 of the isolated DC/DC converter 100r at a following stage. The DC/DC converter 100r steps down the DC voltage $V_{DC}$ to generate an output voltage $V_{OUT}$ stabilized to a target value, and supplies the output voltage $V_{OUT}$ to a load (not shown) connected to an output line 106.

The DC/DC converter 100r includes an output circuit 102 and a control circuit 200r. The output circuit 102 includes a switching transistor M1, a detection resistor $R_{CS}$, a transformer T1, a rectifying diode D1, an output capacitor C1, and a feedback circuit 108. The feedback circuit 108 generates a feedback voltage $V_{FB}$ based on the output voltage $V_{OUT}$, and supplies the generated feedback voltage V to a feedback (FB) terminal of the control circuit 200r.

The switching transistor M1 and the detection resistor $R_{CS}$ form a current loop with a primary coil $L_P$ of the transformer T1. The rectifying diode D1 and the output capacitor C1 are connected to a secondary coil $L_S$ of the transformer T1. A connection point between the switching transistor M1 and the detection resistor $R_{CS}$ is grounded. A voltage drop in proportion to a current $I_P$ flowing through the primary coil $L_P$ and the switching transistor M1 (hereinafter, referred to as a "current detection signal $V_{IS}$") occurs across the detection resistor $R_{CS}$.

An output terminal OUT of the control circuit 200r is connected to a gate of the switching transistor M1. The control circuit 200r includes a duty controller 202, an overcurrent protection circuit 204, and a driver 206. The duty controller 202 is a modulator of a voltage mode, which generates a pulse signal $S_{PWM}$ having a duty ratio adjusted to allow the output voltage $V_{OUT}$ to be close to a predetermined target value, with reference to the feedback voltage $V_{FB}$. The driver 206 switches the switching transistor M1 based on the pulse signal $S_{PWM}$.

The DC/DC converter 100r has an overcurrent protection (OCP) function. That is, when a load current $V_{OUT}$ exceeds a certain threshold value, the DC/DC converter 100r forcibly lowers the output voltage $V_{OUT}$ from a target value $V_{OUT\_REF}$ thereof and also reduces the load current $I_{OUT}$.

The OCP function is mainly realized by resistors R1 and R2 and a voltage detection circuit 114 attached outside of the control circuit 200r and the overcurrent protection circuit 204 contained in the control circuit 200r.

The voltage detection circuit 114 generates a voltage detection signal $V_{VS}$ based on the output voltage $V_{OUT}$. The current detection signal $V_{IS}$ generated by the detection resistor $R_{CS}$ and the voltage detection signal $V_{VS}$ generated by the voltage detection circuit 114 are input to a current detection (CS) terminal of the control circuit 200r respectively through the resistors R1 and R2. An electric potential $V_{CS}$ of the CS terminal is a voltage obtained by weight-averaging the current detection signal $V_{IS}$ and the voltage detection signal $V_{VS}$.

The overcurrent protection circuit 204 compares the detection voltage $V_{CS}$ with a predetermined negative threshold voltage $V_{TH-}$. When the detection voltage $V_{CS}$ is lower than the threshold voltage $V_{TH-}$, the overcurrent protection circuit 204 asserts an overcurrent detection signal $S_{OCP}$ (for example, a high level).

When the overcurrent detection signal $S_{OCP}$ is asserted, the duty controller 202 changes the pulse signal $S_{PWM}$ to an OFF level (level corresponding to OFF of the switching transistor M1).

Figure 2A:
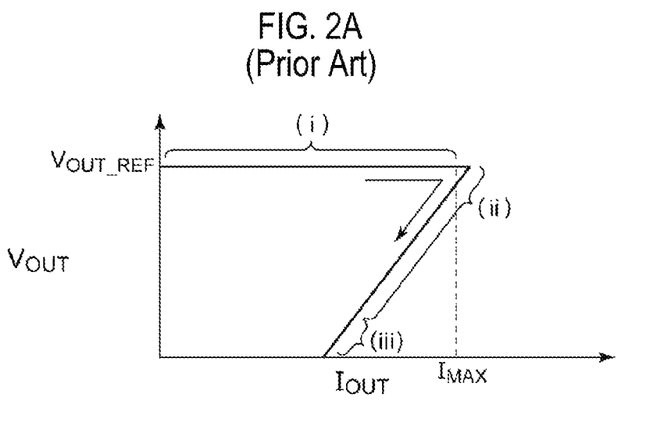
FIGS. 2A and 2B are views illustrating overcurrent protection in a DC/DC converter of FIG. 1.
Figure 2B:
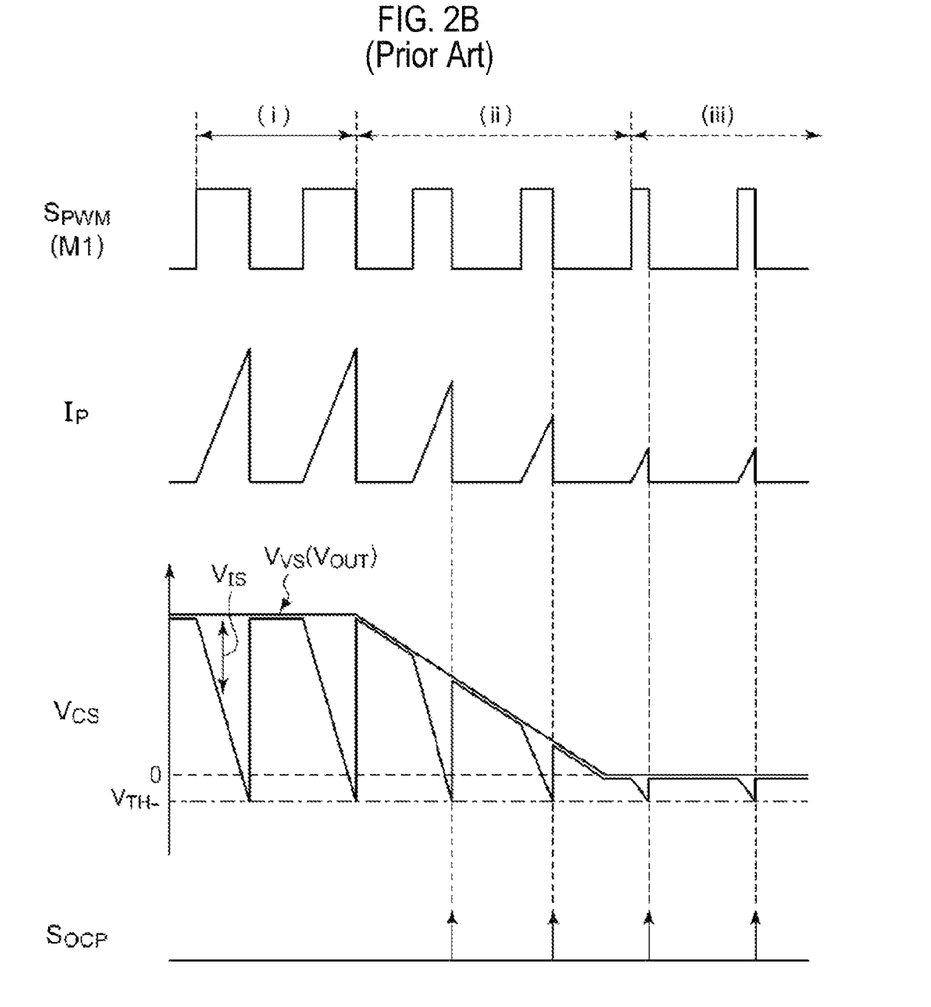

The configuration of the DC/DC converter 100r has been described above. FIGS. 2A and 2B are views illustrating the overcurrent protection in the DC/DC converter 100r of FIG. 1. Specifically, FIG. 2A is a view illustrating voltage-current characteristics of the DC/DC converter 100r, and FIG. 2B is a view illustrating operation waveforms of the DC/DC converter 100r.

In FIG. 2A, when the load current $I_{OUT}$ is changed within a range from 0 to a certain threshold value $I_{MAX}$ (represented as a region (i)), the output voltage $V_{OUT}$ is maintained as the target value $V_{OUT\_REF}$. In this region, the duty ratio of the pulse signal $S_{PWM}$ is determined based on the input voltage $V_{DC}$ and the target value $V_{OUT\_REF}$ of the output voltage $V_{OUT}$, as illustrated in FIG. 2B.

When the load current $I_{OUT}$ exceeds the threshold value $I_{MAX}$ (region (ii)), voltage feedback is invalidated. As illustrated in FIG. 2B, in this region, a peak value of the coil current $I_P$ is limited to a level based on the output voltage $V_{OUT}$. That is, since a base line $V_{VS}$ of the detection voltage $V_{CS}$ is lowered based on the output voltage $V_{OUT}$, a variation width of an amplitude component of the detection voltage $V_{CS}$ is reduced. Accordingly, when the peak of the coil current $I_P$ is limited, the output voltage $V_{OUT}$ is further lowered, and the peak of the coil current $I_P$ is further lowered in a next cycle. The reduction in the coil current $I_P$ indicates a reduction in the load current $I_{OUT}$.

In a region (iii), the output voltage $V_{OUT}$ is substantially lowered down to zero. Then, the coil current $I_P$ is substantially stabilized to a predetermined level.

The present inventor has reviewed the DC/DC converter 100r of FIG. 1 and recognized the following problems.

In the DC/DC converter 100r of FIG. 1, the voltage $V_{CS}$ of the CS terminal is changed based on the output voltage $V_{OUT}$, as well as the coil current $I_P$. Since it assumes that the duty controller 202 is configured as a modulator of a voltage mode, it is difficult to configure the duty controller 202 as a modulator of a current mode.

SUMMARY

The present disclosure provides some embodiments of a DC/DC converter compatible for overcurrent protection and current mode control, and a control circuit thereof.

According to one embodiment of the present disclosure, there is provided a control circuit used in a switching converter, wherein the switching converter includes at least a coil, a switching transistor, and a detection resistor forming a current loop. The control circuit includes: a current detection terminal configured to receive a detection voltage obtained by superimposing a voltage detection signal based on an output voltage from the switching converter on a current detection signal based on a voltage drop of the detection resistor; a sample hold circuit configured to sample-hold the detection voltage in an OFF period of the switching transistor to generate a sample hold voltage; a variable amplifier configured to amplify a difference between the sample hold voltage and the detection voltage in an ON period of the switching transistor, a gain of the variable amplifier being varied based on the sample hold voltage; a duty controller configured to generate a pulse modulation signal having a duty ratio adjusted based on a feedback voltage depending on an output voltage from the switching converter and an output voltage from the variable amplifier; a driver configured to control the switching transistor based on the pulse modulation signal; and an overcurrent protection circuit configured to compare the detection voltage with a predetermined threshold voltage and change the pulse modulation signal to an OFF level of the switching transistor when the detection voltage is identical to the predetermined threshold voltage.

According to this embodiment, by changing the gain of the variable amplifier based on an output voltage from the switching converter, a differential voltage dependent upon only a current flowing through a coil, without being dependent upon an output voltage, can be generated. Thus, an current mode control can be performed by using a differential voltage, while performing overcurrent protection by using a current detection signal.

A connection point between the switching transistor and the detection resistor may be grounded. The current detection signal may be a negative voltage.

The overcurrent protection circuit may include an inverting amplifier configured to invert a polarity of the detection voltage; an overcurrent protection comparator configured to compare an output voltage from the inverting amplifier with a predetermined positive threshold voltage and generate an asserted overcurrent protection signal when the two voltages are identical; and a logic gate configured to change the pulse modulation signal to an OFF level of the switching transistor when the overcurrent protection signal is asserted.

The variable amplifier may be an inverting amplifier.

The variable amplifier may include a first voltage/current (V/I) conversion circuit configured to generate a first current based on a difference between the sample hold voltage and the detection voltage; and a variable resistor disposed on a path of the first current, a resistance value thereof being changed based on the sample hold voltage, wherein the variable amplifier is configured to output a voltage drop of the variable resistor.

The control circuit may further include a second V/I conversion circuit configured to generate a second current based on the sample hold voltage. The resistance voltage of the variable resistor may be changed based on the second current.

The variable resistor may include a first resistor having one end grounded; a first transistor disposed on a path of the second current, a source of the first transistor being grounded; a plurality of second transistors having gates commonly connected to the first transistor and sources grounded; and a plurality of second resistors disposed between drains of the plurality of second transistors and the other end of the first resistor.

A ratio of a channel width and a channel length of the plurality of second transistors may differ.

The first V/I conversion circuit may include a third resistor having one end with the sample hold applied; a fourth resistor having one end with the detection voltage applied; a current mirror circuit including a third transistor having a source connected to the other end of the third resistor and a fourth transistor having a source connected to the other end of the fourth resistor and a gate connected to a drain of the fourth transistor, and is configured to be biased with a constant current; and a fifth transistor having a source connected to the source of the fourth transistor and a gate connected to the drain of the third transistor. The first current may be based on a current flowing through the fifth transistor.

The second V/I conversion circuit may be configured to be identical to the first V/I conversion circuit.

The duty controller may be a modulator of a peak current mode.

The duty controller may include a slope generating circuit configured to superimpose a slope voltage having a predetermined period on the feedback voltage; a pulse modulation comparator configured to compare the feedback voltage on which the slope voltage has been superimposed with the output voltage from the variable amplifier to generate an asserted reset signal when the two voltages are identical; and a logic unit configured to receive a set signal asserted at every predetermined period and the reset signal and generate the pulse modulation signal, which is changed to an OFF level when the reset signal is asserted and is changed to an ON level when the set signal is asserted.

The duty controller may be a modulator of an average current mode.

The duty controller may include an error amplifier configured to amplify errors between the feedback voltage and the output voltage from the variable amplifier, and average amplified errors; and a pulse modulation comparator configured to compare an output voltage from the error amplifier with a ramp waveform or a saw-tooth wave having a predetermined period to generate the pulse modulation signal.

The control circuit may be integrally integrated on a single semiconductor substrate.

As used herein, the term "integrated" is intended to include the case where all the elements of a circuit are formed on a semiconductor substrate and the case where main elements of the circuit are integrally integrated on the semiconductor substrate. In addition, some resistors, capacitors and the like for adjustment of a circuit constant may be provided outside of the semiconductor substrate. By integrating the control circuit in a single integrated circuit (IC)

chip, the circuit area can be reduced and the characteristics of the circuit elements can also be uniformly maintained.

According to another embodiment of the present disclosure, there is provided a switching converter including: an output circuit including at least a coil, a switching transistor, and a detection resistor forming a current loop; and a control circuit.

According to another embodiment of the present disclosure, there is provided an AC/DC converter including: a rectifying circuit configured to rectify an AC voltage; a smoothing capacitor configured to smooth an output voltage from the rectifying circuit; and a switching converter configured to receive a voltage of the smoothing capacitor as an input voltage. The switching converter may include an output circuit including at least a coil, a switching transistor, and a detection resistor forming a current loop; and a control circuit.

According to another embodiment of the present disclosure, there is provided an electronic device including: a load; and the AC/DC converter as described above, wherein the AC/DC converter is configured to supply a DC voltage to the load.

According to another embodiment of the present disclosure, there is provided a power adaptor including the AC/DC converter as described above.

Any combinations of the above-described elements or changes of the representations of the present disclosure between methods and apparatus are effective as embodiments of the present disclosure.

DETAILED DESCRIPTION

Some embodiments of the present disclosure will now be described in detail with reference to the drawings. Throughout the drawings, the same or similar elements, members, and processes are denoted by the same reference numerals and explanation of which will not be repeated. The disclosed embodiments are provided for the purpose of illustration, not limitation, of the present disclosure, and all features and combinations thereof described in the embodiments cannot be necessarily construed to describe the spirit of the present disclosure.

In the specification, the phrase "connection of a member A and a member B" is intended to include direct physical connection of the member A and the member B as well as indirect connection of the member A and the member B via other members as long as the other member has no substantial effect on the electrical connection of the member A and the member B or has no damage to functions and effects shown by a combination of the member A and the member B.

Similarly, the phrase "interposition of a member C between a member A and a member B" is intended to include direct connection of the member A and the member C or direct connection of the member B and the member C as well as indirect connection thereof via other members as long as the other member has no substantial effect on the electrical connection of the member A, the member B and the member C or has no damage to functions and effects shown by a combination of the member A, the member B and the member C.

Figure 3:
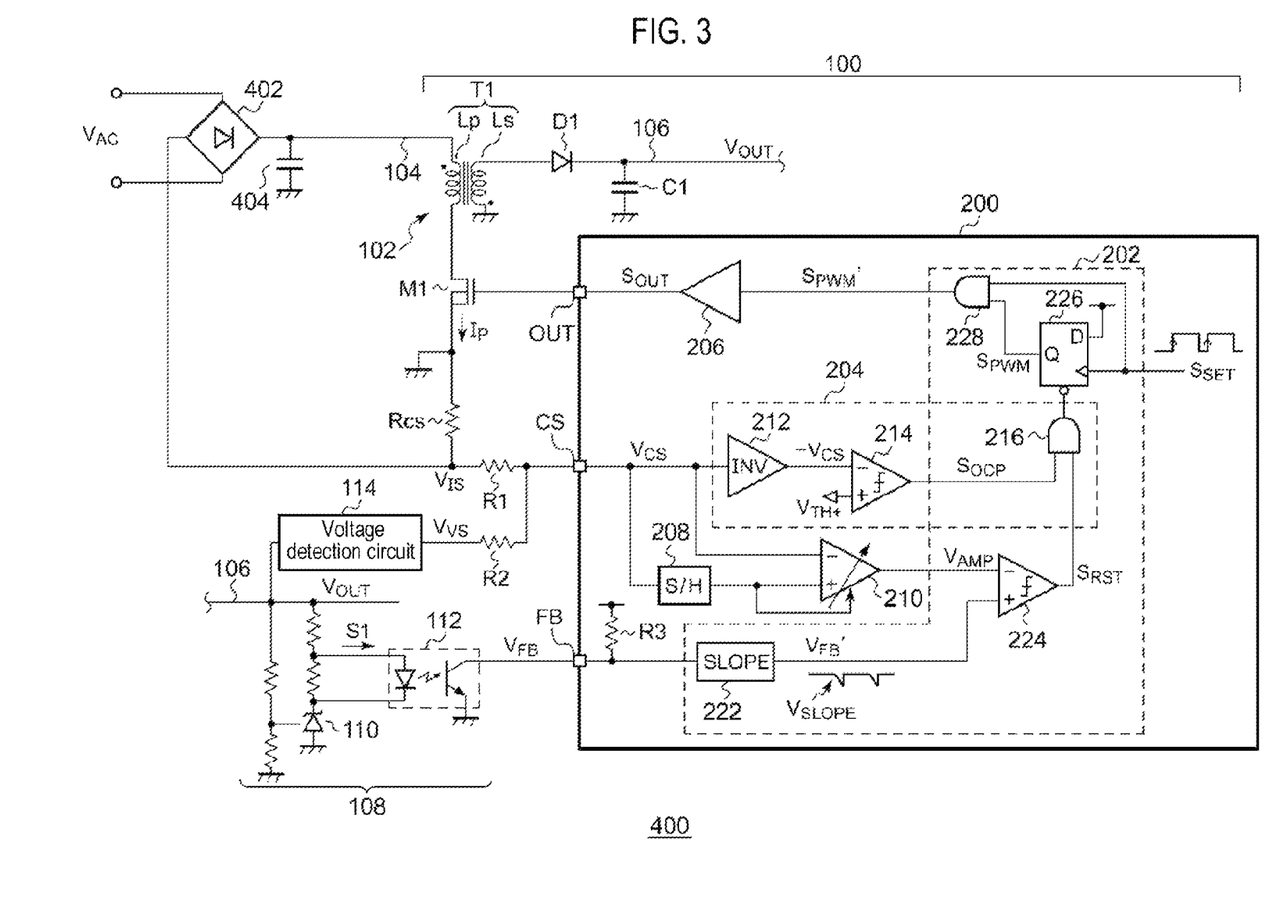
FIG. 3 is a circuit diagram of an AC/DC converter having a control circuit according to an embodiment.

FIG. 3 is a circuit diagram of an AC/DC converter 400 having a control circuit 200 according to an embodiment. The AC/DC converter 400 converts an AC voltage $V_{AC}$ into a DC voltage $V_{OUT}$. A basic configuration of the AC/DC converter 400 is identical to that of the AC/DC converter 400r of FIG. 1, and therefore, only differences therebetween will be largely described below.

The AD/DC converter 400 includes a rectifying circuit 402, a smoothing capacitor 404, and a DC/DC converter 100. The rectifying circuit 402 and the smoothing capacitor 404 are the same as described above with reference to FIG. 1.

A feedback circuit 108 generates a feedback voltage $V_{FB}$ based on an output voltage $V_{OUT}$ from the DC/DC converter 100. For example, the feedback circuit 108 includes a shunt regulator 110 and a photocoupler 112. The shunt regulator 110 generates a feedback signal S1 having a level regulated such that an error between a voltage obtained by dividing the DC voltage $V_{OUT}$ and a predetermined target value VREF becomes zero by amplifying the error.

A light emitting element of a primary side of the photocoupler 112 is controlled by the feedback signal S1 and a signal generated by a light receiving element of a secondary side of the photocoupler 112 is input as the feedback voltage $V_{FB}$ to an FB terminal of a control circuit 200.

Further, in a case where a primary side and a secondary side of a transformer T1 are not required to be insulated, the shunt regulator 110 and the FB terminal may be connected by a wiring without using the photocoupler 112. Also, the function of the shunt regulator 110, that is, the error amplifier may be equipped in the control circuit 200.

A primary coil $L_P$ of the transformer T1, a switching transistor M1, and a detection resistor $R_{CS}$ form a current loop. A connection aspect thereof is the same as shown in FIG. 1, and a voltage drop (current detection signal $V_{IS}$) in proportion to a coil current $I_P$ flowing through the primary coil $L_P$ occurs in the detection resistor $R_{CS}$ during an ON period of the switching transistor M1.

Also, in the present embodiment, a source of the switching transistor M1 and one end of the detection resistor $R_{CS}$ are grounded. The current detection signal $V_{IS}$ generated in the other end of the detection resistor $R_{CS}$ becomes a negative voltage.

$$V_{IS} = -I_P \times R_{CS}$$

Hereinafter, a detailed configuration of the control circuit 200 will be described.

The control circuit 200 includes a duty controller 202, an overcurrent protection circuit 204, a driver 206, and a sample hold circuit 208, which are integrally integrated on a single semiconductor substrate.

The current detection signal $V_{IS}$ is input to a CS terminal through a resistor R1 and a voltage detection signal $V_{VS}$ is input to the CS terminal through a resistor R2. The voltage detection signal $V_{VS}$ is a signal based on the output voltage $VT_{OUT}$. In an application where the primary side and the secondary side of the transformer T1 are required to be insulated, the voltage detection circuit 114 may be configured using a transformer or a photocoupler.

A detection voltage $V_{CS}$ obtained by superimposing the voltage detection signal $V_{VS}$ on the current detection signal $V_{IS}$ is input to the CS terminal.

The sample hold circuit 208 sample-holds the detection voltage $V_{CS}$ in an OFF period of the switching transistor M1 to generate a sample hold voltage $V_{SH}$.

A variable amplifier 210 amplifies a difference ($V_{CS}$−$V_{SH}$) between the sample hold voltage $V_{SH}$ and the detection voltage $V_{CS}$ in an ON period of the switching transistor M1. The variable amplifier 210 is configured such that a gain g of the variable amplifier 210 is varied based on the sample hold voltage $V_{SH}$. More specifically, the gain g of the variable amplifier 210 is increased as the sample hold voltage $V_{SH}$ is lowered.

In the present embodiment, the current detection signal $V_{IS}$ is a negative voltage, and the variable amplifier 210 is an inverting amplifier. An output voltage $V_{AMP}$ from the variable amplifier 210 is given by the following equation:

$$V_{AMP} = g \times (V_{SH} - V_{CS})$$

The duty controller 202 generates a pulse modulation signal $S_{PWM}$ having a duty ratio adjusted based on the feedback voltage $V_{FB}$ and the output voltage $V_{AMP}$ from the variable amplifier 210. In the present embodiment, the duty controller 202 is a modulator of a peak current mode, and has a slope generating circuit 222, a pulse modulation comparator 224, a logic unit 226, and an AND gate 228.

The slope generating circuit 222 superimposes a slope voltage $V_{SLOPE}$ (ripple component) having a predetermined period on the feedback voltage $V_{FB}$. The pulse modulation comparator 224 compares the feedback voltage $V_{FB}'$ having the slope voltage $V_{SLOPE}$ superimposed thereon with the output voltage $V_{AMP}$ from the variable amplifier 210, and when the two voltages are identical, the pulse modulation comparator 224 generates an asserted reset signal $S_{RST}$.

The logic unit 226 receives a set signal $S_{SET}$ asserted at every predetermined period and the reset signal $S_{RST}$ and generates the pulse modulation signal $S_{PWM}$, which is changed to a level (OFF level, e.g., a low level) corresponding to OFF of the switching transistor M1 when the reset signal $S_{RST}$ is asserted, and which is changed to a level (ON level, e.g., a high level) corresponding to ON of the switching transistor M1 when the set signal $S_{SET}$ is asserted. In this manner, the pulse signal $S_{PWM}$ is pulse-width-modulated.

The logic unit 226 is a D flipflop that a high level voltage is input to a data terminal D, the set signal $S_{SET}$ is input to a clock terminal, and the reset signal $S_{RST}$ is input to a clear terminal. Instead of the D flipflop, an RS flipflop may be used or any other sequential circuit may be used.

The set signal $S_{SET}$ has a positive edge (assert) at every predetermined period and has a predetermined maximum duty ratio. The AND gate 228 performs a logical product of an output $S_{PWM}$ from the logic unit 226 and the set signal $S_{SET}$ to limit a duty ratio of the pulse modulation signal $S_{PWM}$ to a maximum duty ratio or lower.

The driver 206 generates a gate pulse signal $S_{OUT}$ based on a pulse modulation signal $S_{PWM}'$ and switches the switching transistor M1.

The overcurrent protection circuit 204 compares the detection voltage $V_{CS}$ with a predetermined threshold voltage $V_{TH-}$, and when the two voltages are identical, the overcurrent protection circuit 204 changes the pulse modulation signal $S_{PWM}$ to an OFF level (low level) of the switching transistor M1. The threshold voltage $V_{TH-}$ is a negative voltage.

The overcurrent protection circuit 204 includes an inverting amplifier 212, an overcurrent protection (OCP) comparator 214, and a logic gate 216. The inverting amplifier 212 inverts a polarity of the detection voltage $V_{CS}$. The OCP comparator 214 compares an output voltage −$V_{CS}$ from the inverting amplifier 212 with a predetermined positive threshold voltage $V_{TH+}$, and when the two voltages are identical, the OCP comparator 214 generates an asserted OCP signal $S_{OCP}$.

The logic gate 216 performs a logical operation of the reset signal $S_{RST}$ and the OCP signal $S_{OCP}$, and outputs the operation result to the clear terminal of the logic unit 226. The AND gate 216 is, for example, an AND gate. In this manner, when the OCP signal $S_{OCP}$ is asserted, the pulse modulation signal $S_{PWM}$ is changed to an OFF level and a peak of the coil current $I_P$ is limited.

Figure 4:
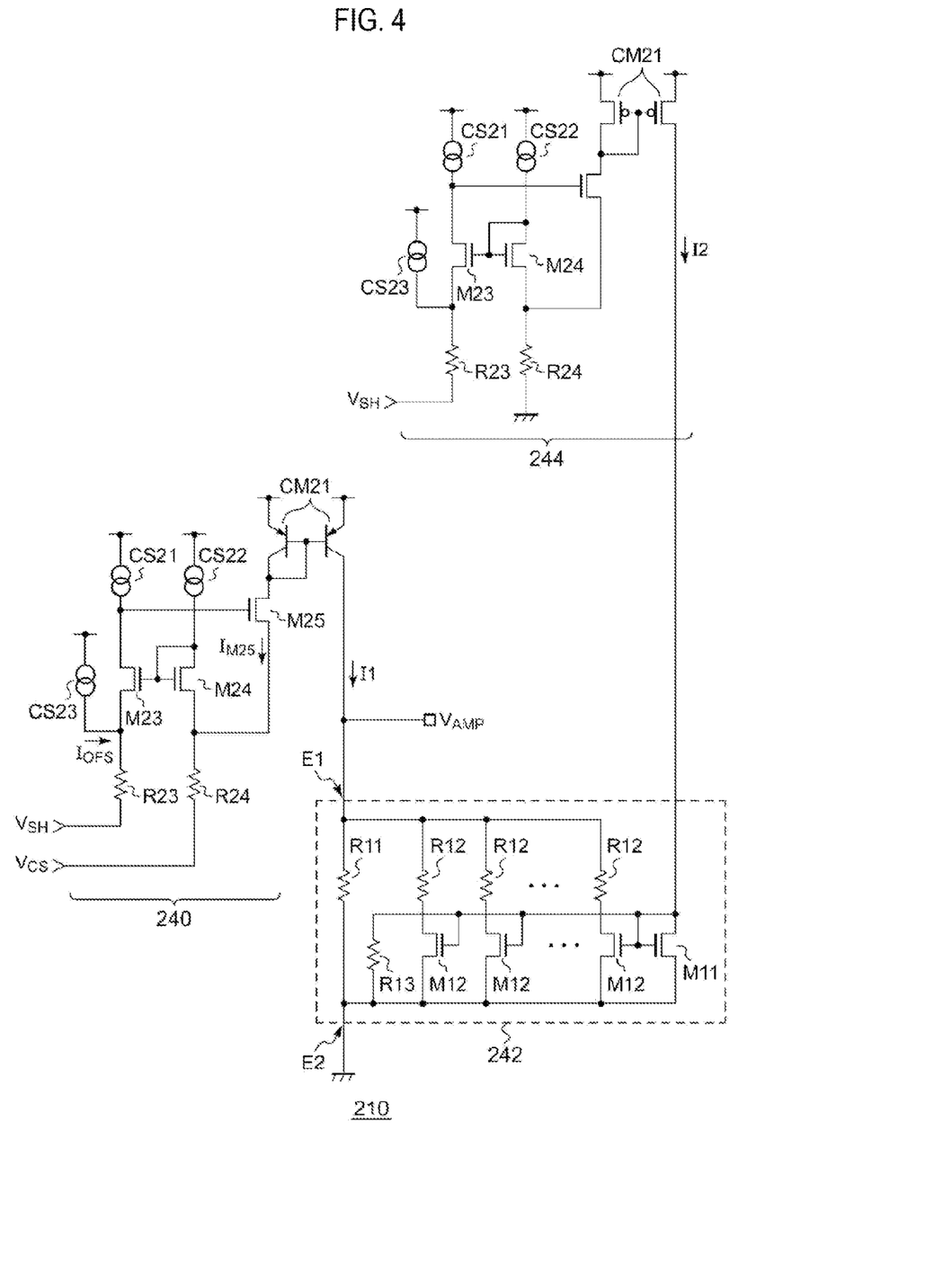
FIG. 4 is a circuit diagram illustrating a configuration example of a variable amplifier.

FIG. 4 is a circuit diagram illustrating a configuration example of the variable amplifier 210. The variable amplifier 210 includes a first V/I conversion circuit 240, a variable resistor 242, and a second V/I conversion circuit 244.

The first V/I conversion circuit 240 generates a first current I1 based on a difference between the sample hold voltage $V_{SH}$ and the detection voltage $V_{CS}$. When a conversion gain of the first V/I conversion circuit 240 is K1, $I1 = K1 \times (V_{SH} - V_{CS})$.

The variable resistor 242 is disposed on a path of the first current I1, and a resistance value R thereof is changed based on the sample hold voltage $V_{SH}$. A voltage drop of the variable resistor 242 becomes an output voltage $V_{AMP}$ of the first V/I conversion circuit.

$$V_{AMP} = R \times I1 = R \times K1 \times (V_{SH} - V_{CS})$$

The gain g of the variable amplifier 210 is R×K1.

The second V/I conversion circuit 244 generates a second current I2 based on the sample hold voltage $V_{SH}$. The resistance value R of the variable resistor 242 is changed based on the second current I2. Specifically, the second current I2 is increased as the sample hold voltage $V_{SH}$ is higher.

The variable resistor 242 includes a first resistor R11, a first transistor M11, a plurality of second transistors M12, and a plurality of second resistors R12. One end of the first resistor R11 is grounded. The first transistor M11 is disposed on a path of the second current I2 and a source thereof is grounded. Gates of the plurality of second transistors M12 are commonly connected to a gate of the first transistor M11, and sources of the plurality of second transistors M12 are grounded.

The plurality of second resistors R12 are disposed between drains of the plurality of second transistors M12 and the other end of the first resistor R11. A resistor R13 is disposed between the gate of the first transistor M11 and a ground.

ON resistance of the second transistors M12 is changed based on the second current I2. Thus, a resistance value R between a first end E1 and a second end E2 of the variable resistor 242 is changed based on the second current I2.

Specifically, as the second current I2 is increased, the resistance value R is reduced. Thus, the gain g of the variable amplifier 210 is decreased as the sample hold voltage $V_{SH}$ is higher, and increased as the sample hold voltage $V_{SH}$ is lower.

The plurality of second transistors M12 may be designed such that a ratio (W/L) of a channel width W and a channel length L thereof differs. The relationship between the second current I2 (in other words, the sample hold voltage $V_{SH}$) and the resistance value R, that is, the relationship between the sample hold voltage $V_{SH}$ and the gain g can be adjusted based on the ratio W/L.

The first V/I conversion circuit 240 includes a third resistor R23, a fourth resistor R24, a third transistor M23, a fourth transistor M24, a fifth transistor M25, current sources CS21, CS22, and CS23, and a current mirror circuit CM21.

The sample hold voltage $V_{SH}$ is applied to one end of the third resistor R23, and the detection voltage $V_{CS}$ is applied to one end of the fourth resistor R24. A source of the third transistor M23 is connected to the other end of the third resistor R23. A source of the fourth transistor M24 is connected to the other end of the fourth resistor R24, and a gate of the fourth transistor M24 is connected to a drain thereof. The third transistor M23 and the fourth transistor M24 form a current mirror circuit and are biased with a low current by the current sources C21 and C22.

A source of the fifth transistor M25 is connected to the source of the fourth transistor M24, and a gate of the fifth transistor M25 is connected to a drain of the third transistor M23. A current $I_{M25}$ based on a difference between the voltages $V_{SH}$ and $V_{CS}$ flows through the fifth transistor M25. The first current I1 is based on the current $I_{M25}$ flowing through the fifth transistor M25. Specifically, the current $I_{M25}$ is duplicated by the current mirror circuit CM21 and the first current I1 is generated.

The current source CS23 generates an offset current $I_{OFS}$. An operating point of the circuit can be adjusted by the offset current $I_{OFS}$.

The second V/I conversion circuit 244 may be configured to be identical to the first V/I conversion circuit 240.

Figure 5A:
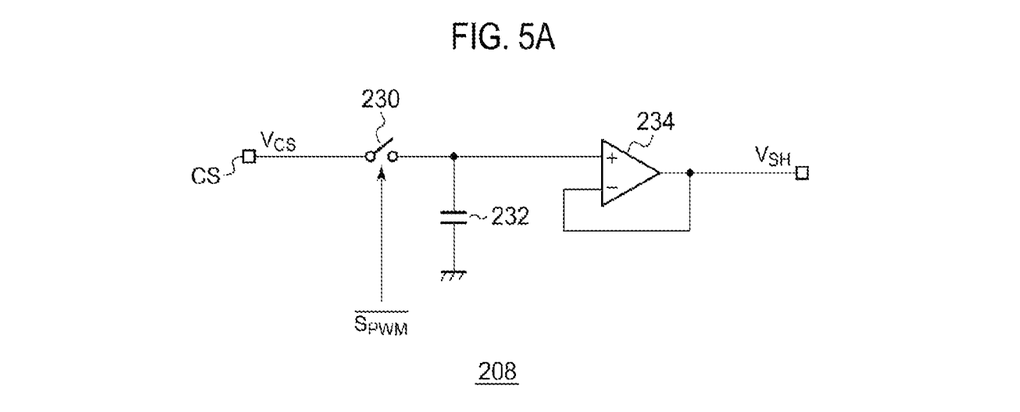
FIGS. 5A and 5B are circuit diagrams illustrating a configuration example of a sample hold circuit.
Figure 5B:
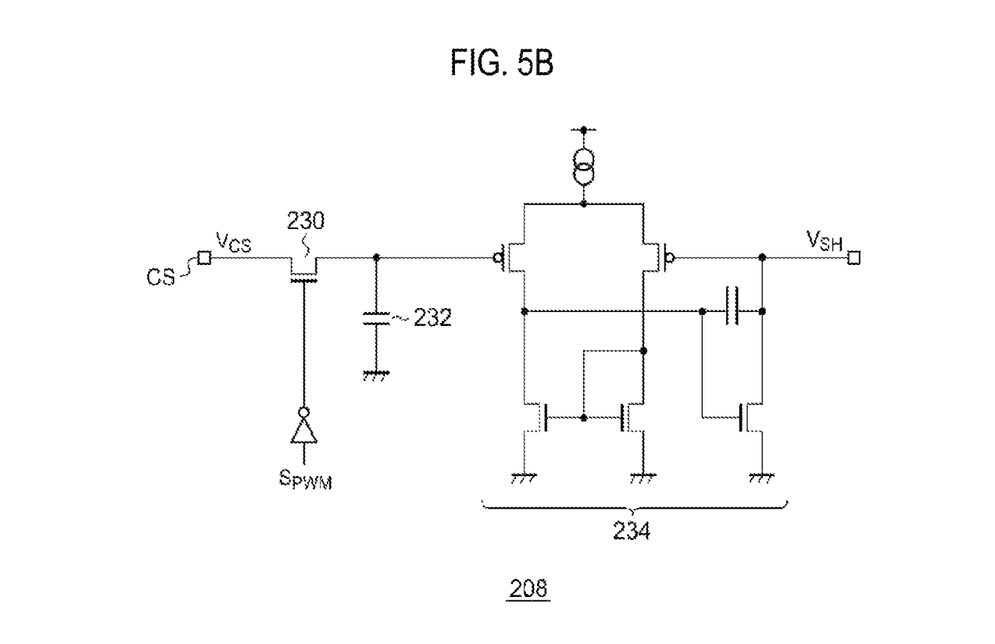

FIGS. 5A and 5B are circuit diagrams illustrating a configuration example of the sample hold circuit 208. The sample hold circuit 208 includes a switch 230, a capacitor 232, and an amplifier 234. The switch 230 is turned on in an OFF period of the switching transistor M1, and when the switching transistor M1 is turned on, the switch 230 is turned off. The amplifier 234 may be configured as a buffer (voltage follower) using a general differential amplifier.

The configuration of the AC/DC converter 400 has been described above. Subsequently, an operation of the DC/DC converter 100 will be described.

Figure 6A:
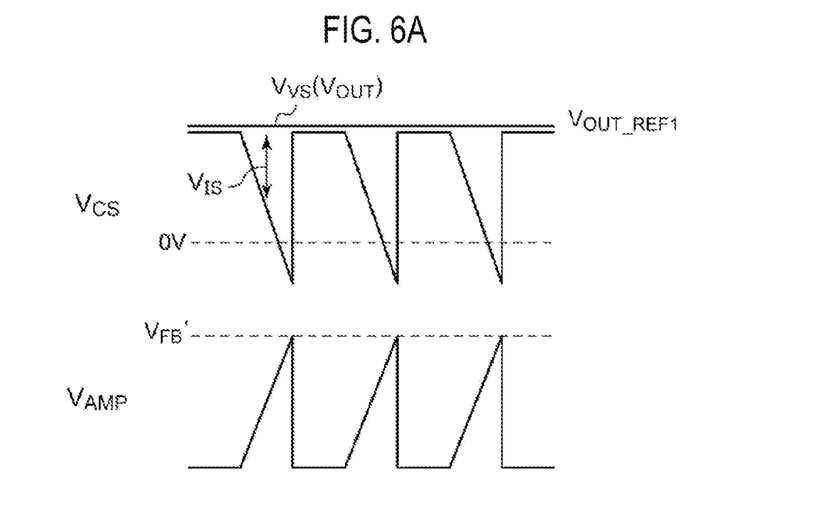
FIGS. 6A to 6C are views illustrating operation waveforms of the DC/DC converter of FIG. 3.
Figure 6B:
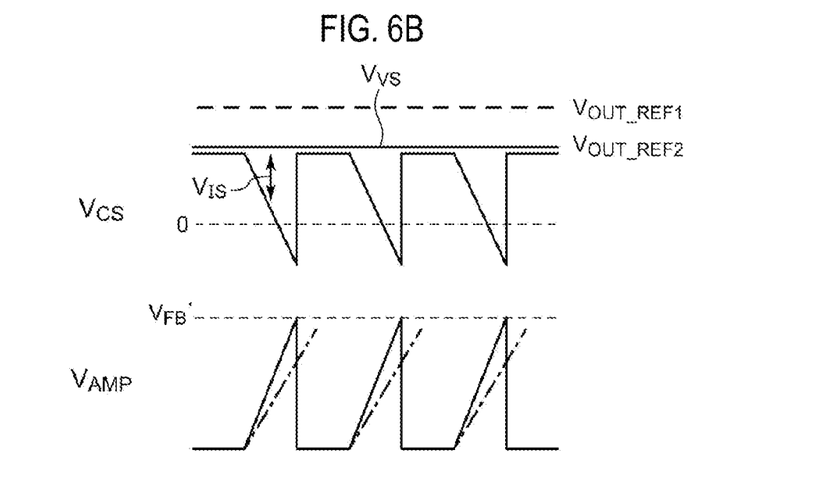
Figure 6C:
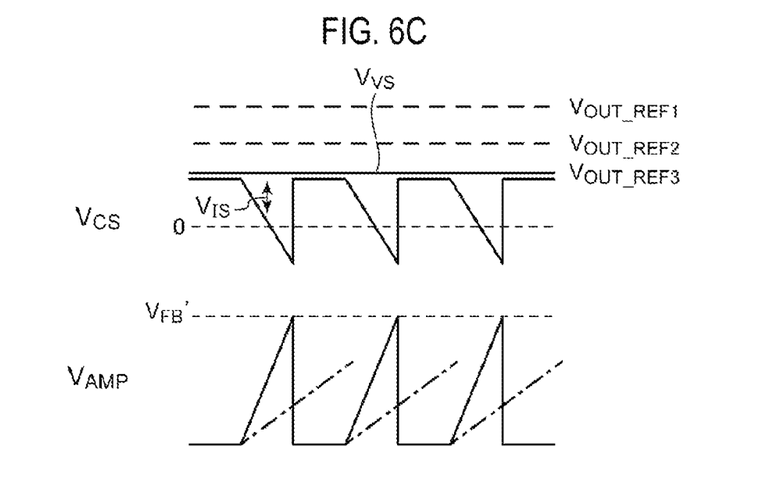

FIGS. 6A to 6C are operation waveform diagrams of the DC/DC converter 100 of FIG. 3. The AC/DC converter 400 of FIG. 3 is used in various platforms and applications, and the target value $V_{OUT\_REF}$ of the output voltage $V_{OUT}$ differs in each platform and each application. FIGS. 6A to 6C illustrate operations in platforms that the target value $V_{OUT\_REF}$ of the output voltage $V_{OUT}$ differs. $V_{OUT\_REF1} > V_{OUT\_REF2} > V_{OUT\_REF3}$ is satisfied. Also, FIGS. 6A to 6C illustrate a general load state in which an overcurrent protection is not performed.

In the DC/DC converter 100, the gain g of the variable amplifier 210 is changed based on the sample hold voltage $V_{SH}$, that is, the output voltage $V_{OUT}$. Thus, the amplitude of the output voltage $V_{AMP}$ from the variable amplifier 210 is substantially uniformly maintained regardless of the high-low of the target value $V_{OUT\_REF}$ of the output voltage $VT_{OUT}$. Accordingly, even though the target value of the output voltage $VT_{OUT}$ is changed, the detection signal $V_{IS}$ based on the coil current and the feedback voltage $V_{FB}'$ can be compared and a current mode control can be performed. That is, the coil current $I_P$ can be reflected in a duty control of the switching transistor M1.

For comparison, in FIGS. 6A to 6C, when the gain g of the variable amplifier 210 is fixed, the waveforms appear as the alternate long and short dash lines. When the gain g is fixed, the target value of the output voltage $V_{OUT}$ is reduced, and thus, the slope of the output voltage $V_{AMP}$ from the variable amplifier 210 is reduced. Accordingly, the output voltage $V_{AMP}$ from the variable amplifier 210 does not reach the feedback voltage $V_{FB}'$, and it is impossible to perform a switching control based on the coil current $I_P$. This problem can be solved by the DC/DC converter 100 according to the embodiment.

The present disclosure has been described above based on the embodiment. The present disclosure is not limited to the above embodiments since these are illustrative only. It should be understood by those skilled in the art that various modifications to combinations of elements or processes may be made and such modifications fall within the scope of the present disclosure. Examples of such modifications will be described below.

Modification 1

Figure 7:
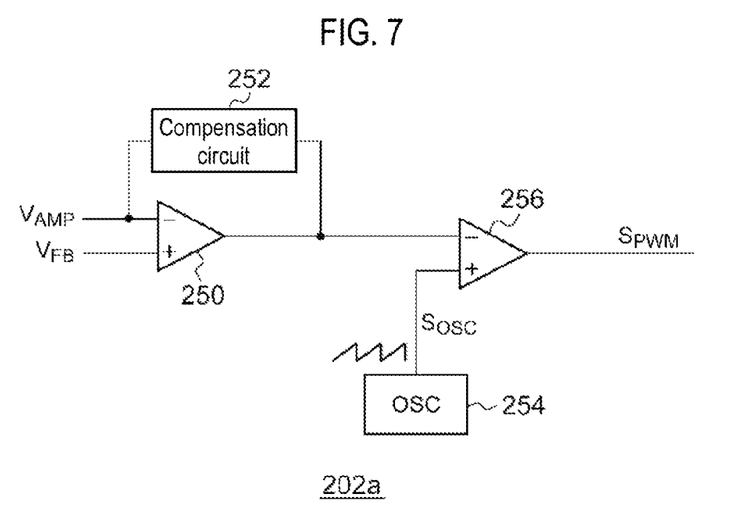
FIG. 7 is a circuit diagram illustrating a modification of a variable amplifier.

The duty controller 202 may be a modulator of an average current mode. FIG. 7 is a circuit diagram illustrating a modification 202a of the duty controller 202.

An error amplifier 250 amplifies errors between the feedback voltage $V_{FB}$ and the output voltage from the variable amplifier 210 and averages the amplified errors. A phase compensation circuit (filter) 252 is inserted in a feedback path of the error amplifier 250. An oscillator 254 generates a period signal $S_{OSC}$ of a ramp waveform or saw-tooth wave having a predetermined period. A pulse modulation comparator 256 compares an output voltage $V_{ERR}$ from the error amplifier 250 with the period signal $S_{OSC}$ to generate a pulse modulation signal $S_{PWM}$.

In this manner, the present disclosure can also be applied to an average current mode control. In addition, the present disclosure can also be applied to a switching converter of a fixed off-time scheme.

Modification 2

The configuration of the first V/I conversion circuit 240 and the second V/I conversion circuit 244 of FIG. 4 is not limited to what is illustrated, and other types of V/I conversion circuits or transconductance amplifiers (gm amplifiers) may also be used.

Modification 3

Figure 8:
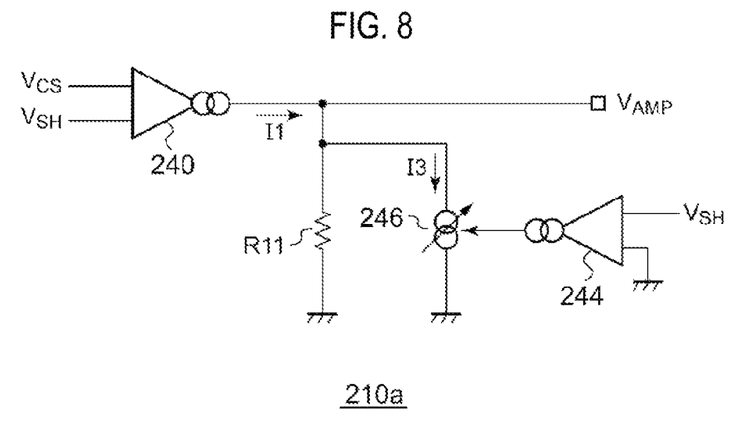
FIG. 8 is a circuit diagram illustrating a modification of the variable amplifier.

FIG. 8 is a circuit diagram illustrating a modification 210a of the variable amplifier 210. The variable amplifier 210a generates a first current I1 based on a difference between the sample hold voltage $V_{SH}$ and the detection voltage $V_{CS}$. A first resistor R11 is disposed on a path of the first current I1, and one end thereof is grounded. The first resistor R11 has a fixed resistance value. A variable current source 246 is connected to the first resistor R11 and generates a correction current I3, which is changed based on the sample hold voltage $V_{SH}$. A second V/I conversion circuit 244 generates a second current I2 based on the sample hold voltage $V_{SH}$.

The variable current source 246 may generate a correction current I3 based on the second current I2. The variable amplifier 210a may output a voltage drop of the first resistor R11, as an output $V_{AMP}$ of the variable amplifier 210a.

The variable amplifier 210 of FIG. 4 may be recognized as the variable amplifier 210a of FIG. 8. In this case, the first resistor R11 of FIG. 4 corresponds to the first resistor R11 of FIG. 8. Also, the first transistor M11, the plurality of second transistors M12, and the plurality of second resistors R12 of FIG. 4 correspond to the variable current source 246.

Fourth Modification

Although the control circuit of the flyback-type DC/DC converter 100 has been described in the embodiment, the type of switching converter is not particularly limited. For example, the DC/DC converter 100 may be a forward-type DC/DC converter or may be a back converter or a boost converter. A configuration of the output circuit 102 may be changed depending on the type of switching converter.

Applications

Finally, the applications of the AC/DC converter 400 will be described. The AC/DC converter 400 may be used for an AC adapter or a power block of an electronic device.

Figure 9:
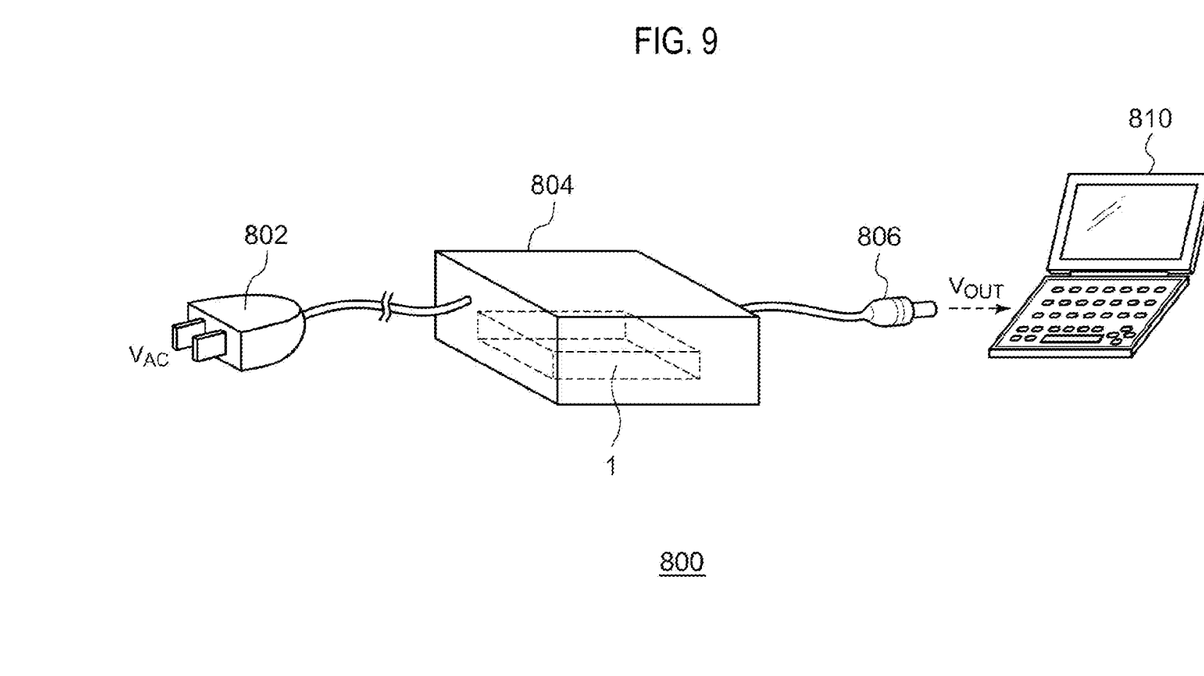
FIG. 9 is a view illustrating an AC adapter having the AC/DC converter.

FIG. 9 is a view illustrating an AC adapter 800 having the AC/DC converter. The AC adapter 800 includes a plug 802, a case 804, and a connector 806. The plug 802 receives a commercial AC voltage $V_{AC}$ from an electrical outlet (not shown). The AC/DC converter is mounted in the case 804. A DC output voltage $V_{OUT}$ generated by the AC/DC converter is supplied from the connector 806 to an electronic device 810. The electronic device 810 may be, for example, a notebook PC, a digital camera, a digital video camera, a portable phone, a portable audio player, and the like.

Figure 10A:
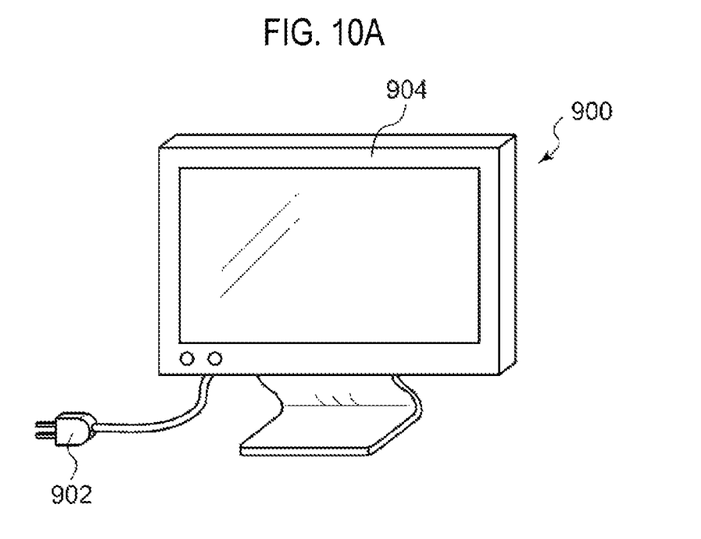
FIGS. 10A and 10B are views illustrating an electronic device having AC/DC converter.
Figure 10B:
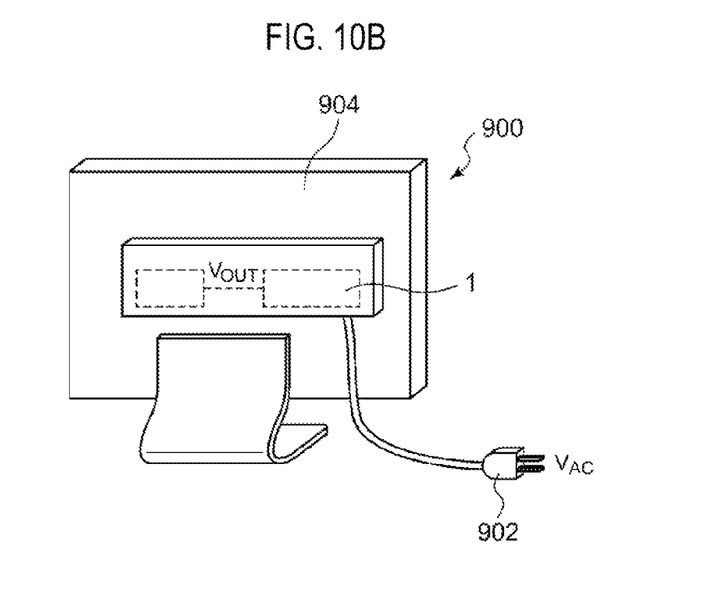

FIGS. 10A and 10B are views illustrating an electronic device 900 having the AC/DC converter. The electronic device 900 of FIGS. 10A and 10B is a display device, but the types of the electronic device 900 are not particularly limited and the electronic device 900 may be any device including a power device, such as an industrial device, an audio device, a refrigerator, a washing machine, or a vacuum cleaner. A plug 902 receives a commercial AC voltage $V_{AC}$ from an electrical outlet (not shown). The AC/DC converter is mounted in a case 904. A DC output voltage $V_{OUT}$ generated by the AC/DC converter is supplied to a load such as a microcomputer, a digital signal processor (DSP), a power circuit, a lighting device, an analog circuit, or a digital circuit equipped in the same case 904.

According to the present disclosure in some embodiments, it is possible to be compatible for the overcurrent protection and the current mode control.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A control circuit used in a switching converter, wherein the switching converter comprises at least a coil, a switching transistor, and a detection resistor forming a current loop, the control circuit comprising:
   a current detection terminal configured to receive a detection voltage obtained by superimposing a voltage detection signal based on an output voltage from the switching converter on a current detection signal based on a voltage drop of the detection resistor;
   a sample hold circuit configured to sample-hold the detection voltage in an OFF period of the switching transistor to generate a sample hold voltage;
   a variable amplifier configured to amplify a difference between the sample hold voltage and the detection voltage in an ON period of the switching transistor, a gain of the variable amplifier being varied based on the sample hold voltage;
   a duty controller configured to generate a pulse modulation signal having a duty ratio adjusted based on a feedback voltage depending on an output voltage from the switching converter and an output voltage from the variable amplifier;
   a driver configured to control the switching transistor based on the pulse modulation signal; and
   an overcurrent protection circuit configured to compare the detection voltage with a predetermined threshold voltage and change the pulse modulation signal to an OFF level of the switching transistor when the detection voltage is identical to the predetermined threshold voltage,
   wherein a connection point between the switching transistor and the detection resistor is grounded,
   wherein the current detection signal is a negative voltage, and
   wherein the variable amplifier is an inverting amplifier.

2. The control circuit of claim 1, wherein the overcurrent protection circuit comprises:
   an inverting amplifier configured to invert a polarity of the detection voltage;
   an overcurrent protection comparator configured to compare an output voltage from the inverting amplifier with a predetermined positive threshold voltage and generate an asserted overcurrent protection signal when the two voltages are identical; and
   a logic gate configured to change the pulse modulation signal to an OFF level of the switching transistor when the overcurrent protection signal is asserted.

3. A control circuit used in a switching converter, wherein the switching converter comprises at least a coil, a switching transistor, and a detection resistor forming a current loop, the control circuit comprising:
   a current detection terminal configured to receive a detection voltage obtained by superimposing a voltage detection signal based on an output voltage from the switching converter on a current detection signal based on a voltage drop of the detection resistor;
   a sample hold circuit configured to sample-hold the detection voltage in an OFF period of the switching transistor to generate a sample hold voltage;
   a variable amplifier configured to amplify a difference between the sample hold voltage and the detection voltage in an ON period of the switching transistor, a gain of the variable amplifier being varied based on the sample hold voltage;
   a duty controller configured to generate a pulse modulation signal having a duty ratio adjusted based on a feedback voltage depending on an output voltage from the switching converter and an output voltage from the variable amplifier;

a driver configured to control the switching transistor based on the pulse modulation signal; and an overcurrent protection circuit configured to compare the detection voltage with a predetermined threshold voltage and change the pulse modulation signal to an OFF level of the switching transistor when the detection voltage is identical to the predetermined threshold voltage, wherein the variable amplifier comprises:
a first voltage/current (V/I) conversion circuit configured to generate a first current based on a difference between the sample hold voltage and the detection voltage; and
a variable resistor disposed on a path of the first current, a resistance value thereof being changed based on the sample hold voltage, and wherein the variable amplifier is configured to output a voltage drop of the variable resistor.

4. The control circuit of claim 3, further comprising a second V/I conversion circuit configured to generate a second current based on the sample hold voltage, wherein the resistance voltage of the variable resistor is changed based on the second current.

5. The control circuit of claim 4, wherein the variable resistor comprises:
a first resistor having one end grounded;
a first transistor disposed on a path of the second current, a source of the first transistor being grounded;
a plurality of second transistors having gates commonly connected to the first transistor, sources of the plurality of second transistors being grounded; and
a plurality of second resistors disposed between drains of the plurality of second transistors and the other end of the first resistor.

6. A control circuit used in a switching converter, wherein the switching converter comprises at least a coil, a switching transistor, and a detection resistor forming a current loop, the control circuit comprising:
a current detection terminal configured to receive a detection voltage obtained by superimposing a voltage detection signal based on an output voltage from the switching converter on a current detection signal based on a voltage drop of the detection resistor;
a sample hold circuit configured to sample-hold the detection voltage in an OFF period of the switching transistor to generate a sample hold voltage;
a variable amplifier configured to amplify a difference between the sample hold voltage and the detection voltage in an ON period of the switching transistor, a gain of the variable amplifier being varied based on the sample hold voltage;
a duty controller configured to generate a pulse modulation signal having a duty ratio adjusted based on a feedback voltage depending on an output voltage from the switching converter and an output voltage from the variable amplifier;
a driver configured to control the switching transistor based on the pulse modulation signal; and
an overcurrent protection circuit configured to compare the detection voltage with a predetermined threshold voltage and change the pulse modulation signal to an OFF level of the switching transistor when the detection voltage is identical to the predetermined threshold voltage, wherein the variable amplifier comprises:
a first V/I conversion circuit configured to generate a first current based on a difference between the sample hold voltage and the detection voltage;
a variable resistor disposed on a path of the first current, one end thereof being grounded, and having a fixed resistance value; and
a variable current source connected to the first resistor, the variable current source being configured to generate a correction current being changed based on the sample hold voltage, and wherein the variable amplifier is configured to output a voltage drop of the first resistor.

7. The control circuit of claim 6, further comprising a second V/I conversion circuit configured to generate a second current based on the sample hold voltage, wherein the correction current is changed based on the second current.

8. The control circuit of claim 7, wherein the variable current source comprises:
a first transistor disposed on a path of the second current, a source of the first transistor being grounded;
a plurality of second transistors having gates commonly connected to the first transistor and sources grounded; and
a plurality of second resistors disposed between drains of the plurality of second transistors and the other end of the first resistor.

9. The control circuit of claim 5, wherein a ratio of a channel width and a channel length of the plurality of second transistors differs.

10. The control circuit of claim 3, wherein the first V/I conversion circuit comprises:
a third resistor having one end with the sample hold voltage applied;
a fourth resistor having one end with the detection voltage applied;
a current mirror circuit including a third transistor with a source connected to the other end of the third resistor and a fourth transistor with a source connected to the other end of the fourth resistor and a gate connected to a drain of the fourth transistor, and is configured to be biased with a constant current; and
a fifth transistor with a source connected to the source of the fourth transistor and a gate connected to the drain of the third transistor, wherein the first current is based on a current flowing through the fifth transistor.

11. The control circuit of claim 4, wherein the second V/I conversion circuit is configured to be identical to the first V/I conversion circuit.

12. A control circuit used in a switching converter, wherein the switching converter comprises at least a coil, a switching transistor, and a detection resistor forming a current loop, the control circuit comprising:
a current detection terminal configured to receive a detection voltage obtained by superimposing a voltage detection signal based on an output voltage from the switching converter on a current detection signal based on a voltage drop of the detection resistor;
a sample hold circuit configured to sample-hold the detection voltage in an OFF period of the switching transistor to generate a sample hold voltage;
a variable amplifier configured to amplify a difference between the sample hold voltage and the detection voltage in an ON period of the switching transistor, a gain of the variable amplifier being varied based on the sample hold voltage;

a duty controller configured to generate a pulse modulation signal having a duty ratio adjusted based on a feedback voltage depending on an output voltage from the switching converter and an output voltage from the variable amplifier;

a driver configured to control the switching transistor based on the pulse modulation signal; and an overcurrent protection circuit configured to compare the detection voltage with a predetermined threshold voltage and change the pulse modulation signal to an OFF level of the switching transistor when the detection voltage is identical to the predetermined threshold voltage, wherein the duty controller is a modulator of a peak current mode, and wherein the duty controller comprises:
 a slope generating circuit configured to superimpose a slope voltage having a predetermined period on the feedback voltage;
 a pulse modulation comparator configured to compare the feedback voltage on which the slope voltage has been superimposed with the output voltage from the variable amplifier to generate an asserted reset signal when the two voltages are identical; and
 a logic unit configured to receive a set signal asserted at every predetermined period and the reset signal and generate the pulse modulation signal, which is changed to an OFF level when the reset signal is asserted and is changed to an ON level when the set signal is asserted.

13. A control circuit used in a switching converter, wherein the switching converter comprises at least a coil, a switching transistor, and a detection resistor forming a current loop, the control circuit comprising:
 a current detection terminal configured to receive a detection voltage obtained by superimposing a voltage detection signal based on an output voltage from the switching converter on a current detection signal based on a voltage drop of the detection resistor;
 a sample hold circuit configured to sample-hold the detection voltage in an OFF period of the switching transistor to generate a sample hold voltage;
 a variable amplifier configured to amplify a difference between the sample hold voltage and the detection voltage in an ON period of the switching transistor, a gain of the variable amplifier being varied based on the sample hold voltage;

a duty controller configured to generate a pulse modulation signal having a duty ratio adjusted based on a feedback voltage depending on an output voltage from the switching converter and an output voltage from the variable amplifier;

a driver configured to control the switching transistor based on the pulse modulation signal; and an overcurrent protection circuit configured to compare the detection voltage with a predetermined threshold voltage and change the pulse modulation signal to an OFF level of the switching transistor when the detection voltage is identical to the predetermined threshold voltage, wherein the duty controller is a modulator of an average current mode, and wherein the duty controller comprises:
 an error amplifier configured to amplify errors between the feedback voltage and the output voltage from the variable amplifier, and average amplified errors; and
 a pulse modulation comparator configured to compare an output voltage from the error amplifier with a ramp waveform or a saw-tooth wave having a predetermined period to generate the pulse modulation signal.

14. The control circuit of claim 1, wherein the control circuit is integrally integrated on a single semiconductor substrate.

15. A switching converter, comprising:
 an output circuit comprising at least a coil, a switching transistor, and a detection resistor forming a current loop; and
 a control circuit of claim 1.

16. An AC/DC converter, comprising:
 a rectifying circuit configured to rectify an AC voltage;
 a smoothing capacitor configured to smooth an output voltage from the rectifying circuit; and
 a switching converter configured to receive a voltage of the smoothing capacitor as an input voltage,
 wherein the switching converter comprises:
  an output circuit comprising at least a coil, a switching transistor, and a detection resistor forming a current loop; and
  a control circuit of claim 1.

17. An electronic device, comprising:
 a load; and
 an AC/DC converter of claim 16, wherein the AC/DC converter is configured to supply a DC voltage to the load.

18. A power adaptor comprising an AC/DC converter of claim 16.

* * * * *